(12) United States Patent
Hsieh (10) Patent No.: US 11,378,644 B2
(45) Date of Patent: Jul. 5, 2022

(54) ULTRA WIDEBAND DYNAMIC POSITIONING METHOD AND SYSTEM THEREOF

(71) Applicant: Universal Scientific Industrial (Shanghai) Co., Ltd., Shanghai (CN)

(72) Inventor: Ta-Te Hsieh, Shanghai (CN)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 71 days.

(21) Appl. No.: 16/786,980

(22) Filed: Feb. 10, 2020

(65) Prior Publication Data

US 2021/0088616 A1 Mar. 25, 2021

(30) Foreign Application Priority Data

Sep. 19, 2019 (CN) .......................... 201910885426.2

(51) Int. Cl.
*G01S 5/02* (2010.01)
*G01S 1/04* (2006.01)
*G01S 1/68* (2006.01)

(52) U.S. Cl.
CPC ............ *G01S 5/0289* (2013.01); *G01S 1/045* (2013.01); *G01S 1/68* (2013.01); *G01S 1/685* (2013.01); *G01S 5/0252* (2013.01)

(58) Field of Classification Search
CPC .. G01S 5/0284–0289; G01S 1/68–685; H04W 64/00; H04W 4/023; H04W 4/029; H04W 4/02

See application file for complete search history.

(56) References Cited

U.S. PATENT DOCUMENTS

| 8,436,725 B2 * | 5/2013 | Caetano Pereria .... | H04K 3/226 340/508 |
| 9,189,948 B2 * | 11/2015 | Hsu ........................ | G08B 21/24 |
| 2003/0072306 A1 * | 4/2003 | Hunzinger ............ | G01S 5/0289 370/389 |
| 2011/0102180 A1 * | 5/2011 | Choi ...................... | G01S 5/0289 340/572.4 |

FOREIGN PATENT DOCUMENTS

CN 109561062 A 4/2019

* cited by examiner

*Primary Examiner* — Cassi J Galt
(74) *Attorney, Agent, or Firm* — CKC & Partners Co., LLC (57) ABSTRACT

An ultra wideband (UWB) dynamic positioning method and a system thereof are provided. A target UWB device detecting step includes driving a host UWB device to detect whether a target UWB device or at least one first-order seeking UWB device is around the host UWB device, and then a detecting result is generated. A host UWB device operation deciding step includes deciding an operating mode of the host UWB device according to the detecting result. When the target UWB device is around the host UWB device, the operating mode includes calculating a moving direction from the host UWB device to the target UWB device. When there is the first-order seeking UWB device around the host UWB device without the target UWB device, the operating mode includes switching on the first-order seeking UWB device to enter a seeking mode.

16 Claims, 11 Drawing Sheets

ULTRA WIDEBAND DYNAMIC POSITIONING METHOD AND SYSTEM THEREOF

RELATED APPLICATIONS

This application claims priority to China application No. 201910885426.2, filed on Sep. 19, 2019, which is herein incorporated by reference.

BACKGROUND

Field of Invention

The present invention relates to a dynamic positioning method and a system thereof. More particularly, the present invention relates to an ultra wideband dynamic positioning method and a system thereof.

Description of Related Art

The current positioning system mainly takes the several following methods. 1. Global positioning system (GPS), which power output is large, the precision is 5 m to 10 m, is only for outdoor but ineffective at indoor, and is affected by weather, its electric consumption is large, and the cost of the satellite setting is higher. 2. Cellular Network, which does not consume the electric of the mobile additionally, the precision is 150 m, and it needs to receive the signals from three base stations, but the positioning precision is low. 3. Bluetooth, which power output is about 12 dBm, the precision is 30 cm, it is interfered easily, and its cost is a little high. 4. Wireless network Wi-Fi, which power output is 30 dBm, the precision is 2 m to 3 m, the construction is complex, and its electric consumption is high. 5. Radio Frequency Identification (RFID), which power output is about 3 dBm, the precision is 2 m to 3 m, but it does not have communication function, and the safety is low. 6. Wireless network ZigBee, which power output is about 20 dBm, the precision is 2 m to 3 m, and it is affected easily. Furthermore, the aforementioned techniques all could not perform a height positioning. Accordingly, the current market is lack of a positioning method and system thereof with low power, high safety, high transmission volume, low cost, which are able to perform a height positioning. Therefore, the related operators all are searching the solution thereof.

SUMMARY

According to one aspect of the present disclosure, an ultra wideband (UWB) dynamic positioning method includes a target UWB device detecting step and a host UWB device operation deciding step. The target UWB device detecting step includes driving a host UWB device to detect whether there is a target UWB device or at least one first-order seeking UWB device around the host UWB device, and then generating a detecting result. The host UWB device operation deciding step includes deciding an operating mode of the host UWB device according to the detecting result. When there is the target UWB device around the host UWB device, the operating mode includes calculating a moving direction from the host UWB device to the target UWB device. When there is the at least one first-order seeking UWB device around the host UWB device without the target UWB device, the operating mode includes switching on the at least one first-order seeking UWB device to enter a seeking mode. When there is neither the target UWB device nor the at least one first-order seeking UWB device around the host UWB device, the operating mode includes switching on the host UWB device to enter a sharing mode.

According to another aspect of the present disclosure, an ultra wideband (UWB) dynamic positioning method includes a target UWB device detecting step and a host UWB device operation deciding step. The target UWB device detecting step includes driving a host UWB device and an ith-order seeking UWB device to detect a target UWB device, and then generating a detecting result. The host UWB device operation deciding step includes deciding an operating mode of the host UWB device according to the detecting result. When the host UWB device detects the target UWB device via the ith-order seeking UWB device, the operating mode includes calculating a moving direction from the host UWB device to the target UWB device. A trajectory path is formed among the host UWB device, the ith-order seeking UWB device and the target UWB device, and a distance between any two adjacent devices among the host UWB device, the ith-order UWB device and the target UWB device is less than or equal to a seeking radius. i is a positive integer, and i is larger than or equal to 1 and less than or equal to a seeking limitation order.

According to further another aspect of the present disclosure, an ultra wideband (UWB) dynamic positioning system for using the ultra wideband (UWB) dynamic positioning method of aforementioned aspect includes the target UWB device, the at least one first-order seeking UWB device and the host UWB device. The target UWB device and the at least one first-order seeking UWB device are in the sharing mode. The host UWB device is configured to detect whether there is the target UWB device or the at least one first-order seeking UWB device around. When there is the target UWB device around the host UWB device, the host UWB device generates the moving direction. When there is the at least one first-order seeking UWB device around the host UWB device without the target UWB device, the at least one first-order seeking UWB device enters the seeking mode. When there is neither the target UWB device nor the at least one first-order seeking UWB device around the host UWB device, the host UWB device enters the sharing mode.

It is to be understood that both the foregoing general description and the following detailed description are by embodiments, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

A plurality of embodiments of the present disclosure is illustrated in the drawings as follows, for clear explanation, many practice details will be described in the following. However, it should be understood that the detail in actual would not be used to limit the present disclosure. In other words, in some embodiments of the present disclosure, these details are optional in practice. Furthermore, for simplifying the drawings, some known structures and elements will be shown in simplified illustration, and the same reference numbers are used in the drawings and the description to refer to the same parts.

Additionally, when a component (or a unit or a module, etc.) "is connected to" another component, it could represent that the component is directly connected to the another component, and also could represent that a component is indirectly connected to the another component; that is, there is other component between the component and the another component. When it obviously shows that a component is "directly connected" to the another component, it represents there is no other component between the component and the another component. The terms, "the first", "the second", "the third" etc., are used to describe the different component and are not used to limit the component, so the first component could be named as the second component. The combination of component/unit/circuit in the present disclosure is not a well-known, usual, or prior combination in the art, it could not be based on whether the component/unit/circuit is prior art to determine that whether the combination is easily accomplished by those skilled in the art.

Figure 1:
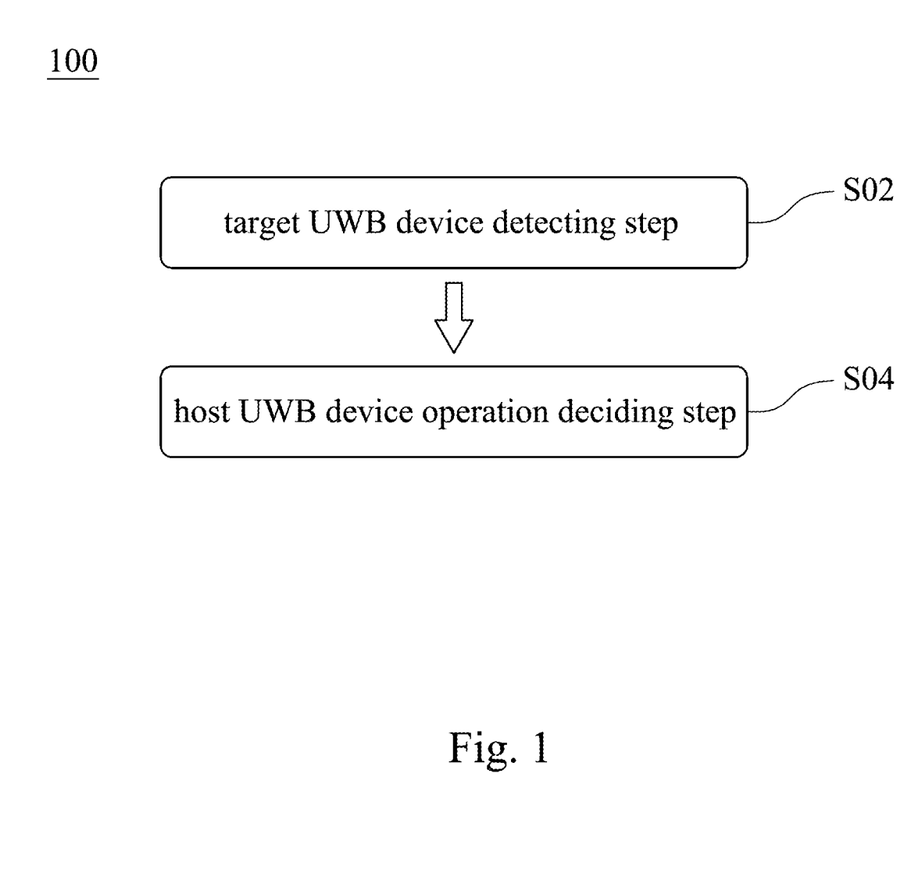
FIG. 1 is a flow chart of an ultra wideband (UWB) dynamic positioning method according to a 1st embodiment of the present disclosure.
Figure 2:
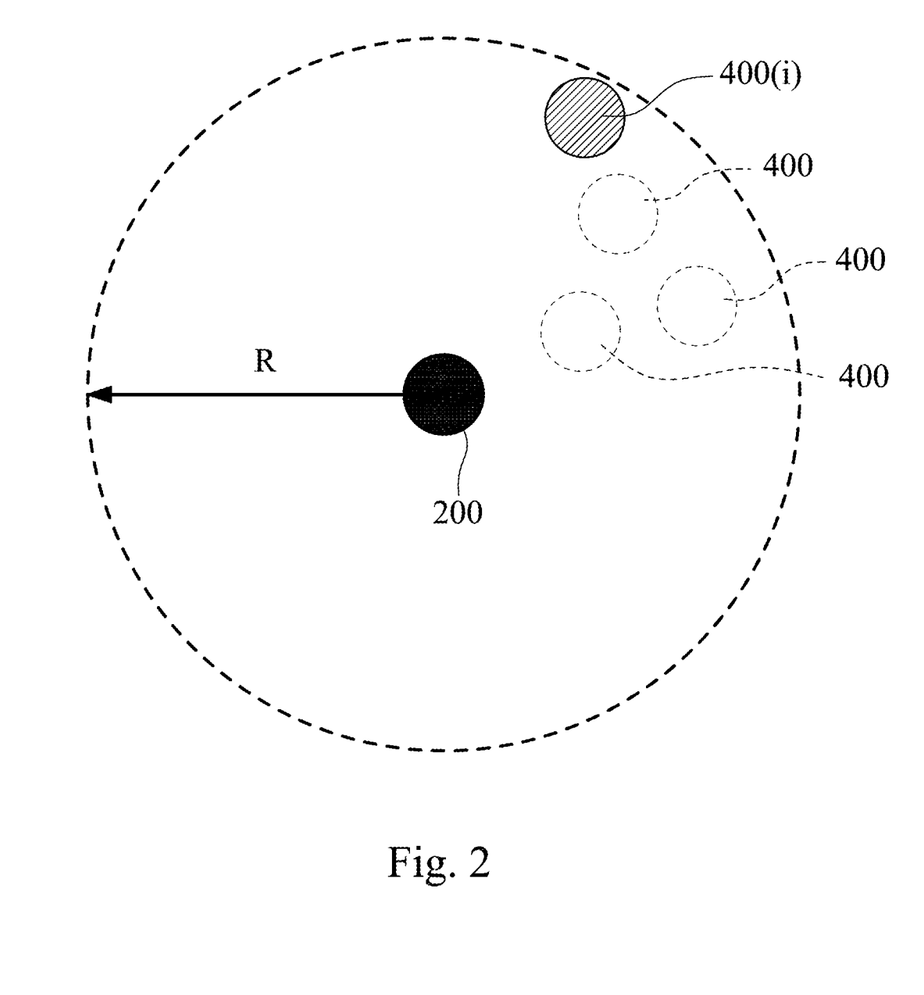
FIG. 2 is a schematic view of a seeking radius of a host UWB device according to one embodiment of the present disclosure.

Please refer to FIG. 1 and FIG. 2. FIG. 1 is a flow chart of an ultra wideband (UWB) dynamic positioning method 100 according to a 1st embodiment of the present disclosure, and FIG. 2 is a schematic view of a seeking radius R of a host UWB device 200 according to one embodiment of the present disclosure. The UWB dynamic positioning method 100 includes a target UWB device detecting step S02 and a host UWB device operation deciding step S04.

In the target UWB device detecting step S02, the host UWB device 200 is driven to detect whether a target UWB device 300 (please refer to FIG. 4) or at least one first-order seeking UWB device 400(1) around, and a detecting result is generated. In detail, when there is the target UWB device 300 around the host UWB device 200, it represents that a distance between the host UWB device 200 and the target UWB device 300 is less than or equal to a seeking radius R. When there is at least one first-order seeking UWB device 400(1) around the host UWB device 200, it represents that a distance between the host UWB device 200 and the at least one first-order seeking UWB device 400(1) is less than or equal to the seeking radius R. Furthermore, if there are several UWB devices 400 within a range less than or equal to the seeking radius R from the host UWB device 200 as center, the UWB device 400 farthest to the host UWB device 200 is chosen to be the first-order seeking UWB device 400(1).

In the host UWB device operation deciding step S04, an operation mode of the host UWB device 200 is decided according to the detecting result. In detail, when there is the target UWB device 300 around the host UWB device 200, the operation mode includes calculating a moving path from the host UWB device 200 to the target UWB device 300. The moving path includes an X-axis parameter and a Y-axis parameter, and a moving direction and a moving distance of the host UWB device 200 is calculated via the X-axis parameter and the Y-axis parameter.

Moreover, when there is at least one first-order seeking UWB device 400(1) around the host UWB device 200 without the target UWB device 300, the operation mode includes switching on the at least one first-order seeking UWB device 400(1) to enter a seeking mode. The seeking mode includes an ith-order seeking step, for detecting whether the target UWB device 300 or at least one i+1th-order seeking UWB device 400(i+1) (for example, the seeking UWB device 400(2) of FIG. 4) is around at least one ith-order UWB device 400(i) (for example, the seeking UWB device 400(1) of FIG. 4); in other words, the seeking mode includes detecting whether there is the target UWB device 300 or at least one i+1th-order seeking UWB device 400(i+1) within a range less than or equal to the seeking radius R from the at least one ith-order seeking UWB device 400(i).

In detail, the ith-order seeking step includes a first seeking sub-step, a second seeking sub-step and a third seeking sub-step. In the first seeking sub-step, when there is the target UWB device 300 around the at least one ith-order seeking UWB device 400(i), a first-order seeking path to the ith-order seeking path between the host UWB device 200 and the at least one ith-order seeking UWB device 400(i) and an i+1th-order seeking path from the at least one ith-order seeking UWB device 400(i) to the target UWB device 300 are calculated, and then the moving direction from the host UWB device 200 to the target UWB device 300 is calculated according to the first-order seeking path to the i+1th-order seeking path, finally, the detection is stopped, and at least one ith-order seeking UWB device 400(i) is switched on to enter the sharing mode. A distance between the at least one ith-order seeking UWB device 400(i) and the target UWB device 300 is less than or equal to the seeking radius R. The seeking path includes an X-axis parameter (one of X1 to Xi) and a Y-axis parameter (one of Y1 to Yi), and a seeking direction and a seeking distance of each seeking UWB device 400(i) are calculated by the X-axis parameter and the Y-axis parameter. Furthermore, in the second seeking sub-step, when there is at least one i+1th-order seeking UWB device 400(i+1) around the ith-order seeking UWB device 400(i) without the target UWB device 300, the at least one i+1th-order seeking UWB device 400(i+1) is switched on to perform an i+1th-order seeking step, in which the target UWB device 300 is detected whether around the at least one i+1th-order seeking UWB device 400(i+1). A distance between the ith-order seeking UWB device 400(i) and the i+1th-order seeking UWB device 400(i+1) is less than or equal to the seeking radius R. A difference between the i+1th-order seeking step and the foregoing ith-order seeking step of the at least one ith seeking UWB device 400(i) is that the seeking is performed for the different ith-order seeking UWB device 400(i). Additionally, in the third seeking sub-step, when there is neither the target UWB device 300 nor the at least one i+1th-order seeking UWB device 400(i+1) around the at least ith-order seeking UWB device 400(i), the at least one ith-order seeking UWB device 400(i) is switched on to enter the sharing mode; in other words, when there is not any UWB device around the at least one ith-order seeking UWB device 400(i), the detection is stopped, and the at least one ith-order seeking UWB device 400(i) enters the sharing mode. It is worth mentioned that in the ith-order seeking step, when i is less than or equal to the seeking limitation order, the at least one ith-order seeking UWB device 400(i) performs the first seeking sub-step, the second seeking sub-step and the third seeking sub-step; then, i is increased by adding 1, and the first seeking sub-step, the second seeking sub-step and the third seeking sub-step of the ith-order seeking step are performed repeatedly until the target UWB device 300 is found or there is not any UWB device around. When i is larger than the seeking limitation order, the detection is stopped, and the at least one ith-order seeking UWB device 400(i) enters the sharing mode.

Additionally, when there is neither the target UWB device 300 nor the at least one ith-order seeking UWB device 400(i) around the host UWB device 200, the operation mode includes switching on the host UWB device 200 to enter the sharing mode. The sharing mode includes a medium that allows the connection of other UWB device and transmits the information.

Accordingly, the UWB dynamic positioning method 100 of the present disclosure utilizes plural mobile UWB devices to mutually track with each other instead of setting a UWB base station so as to eliminate the cost of the UWB base station and perform dynamic positioning. Furthermore, the UWB dynamic positioning method 100 of the present disclosure performs a seeking by a reciprocity method without disclosing personal information and preforms a seeking of an authorized target, such as products, stores etc. Additionally, a real-time people control could be performed, such as electronic rollcall, patient care, electronic monitoring, 3D road guiding for blinder, or push notification of stores.

Figure 3:
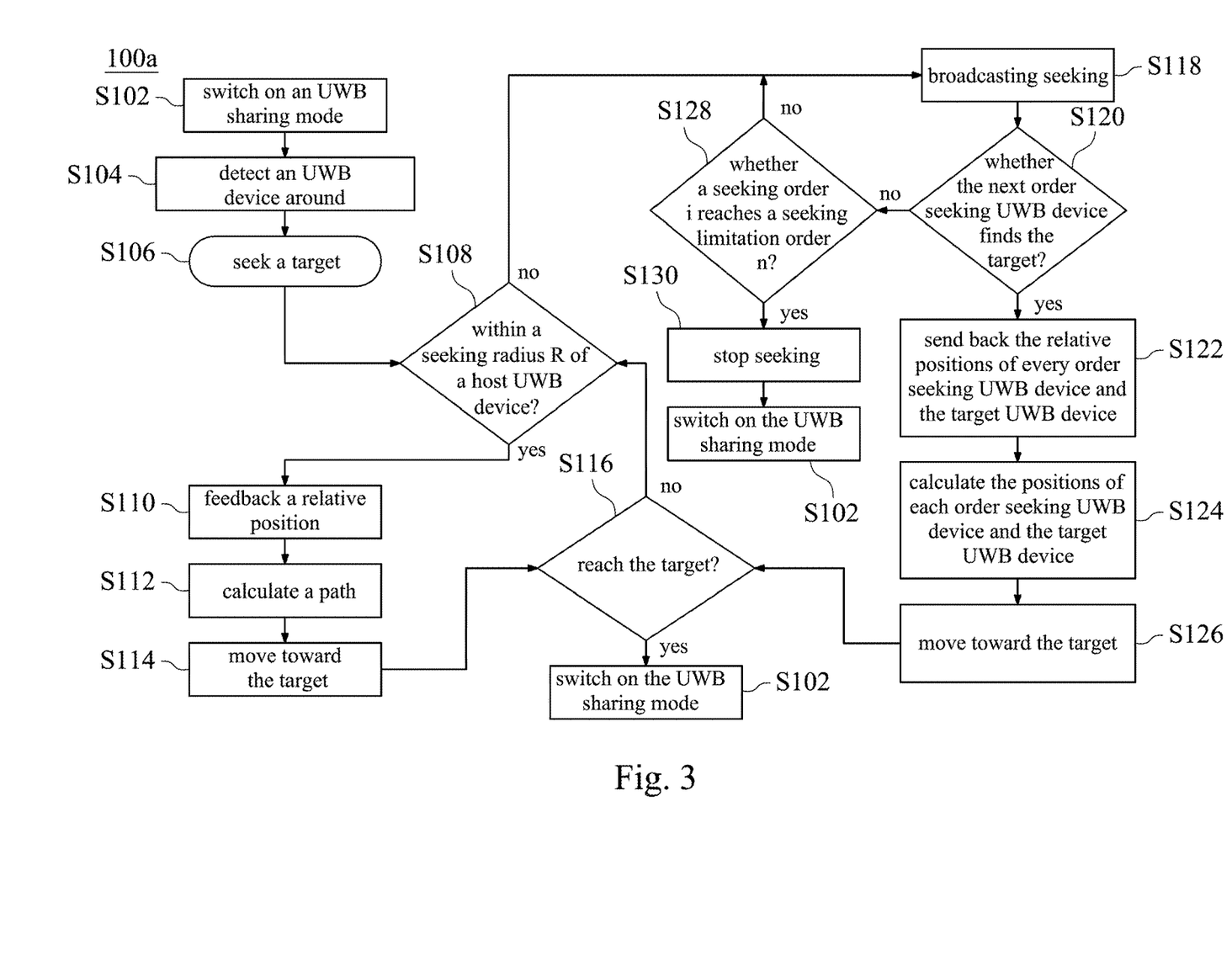
FIG. 3 is a flow chart of an ultra wideband (UWB) dynamic positioning method according to a 2nd embodiment of the present disclosure.
Figure 4:
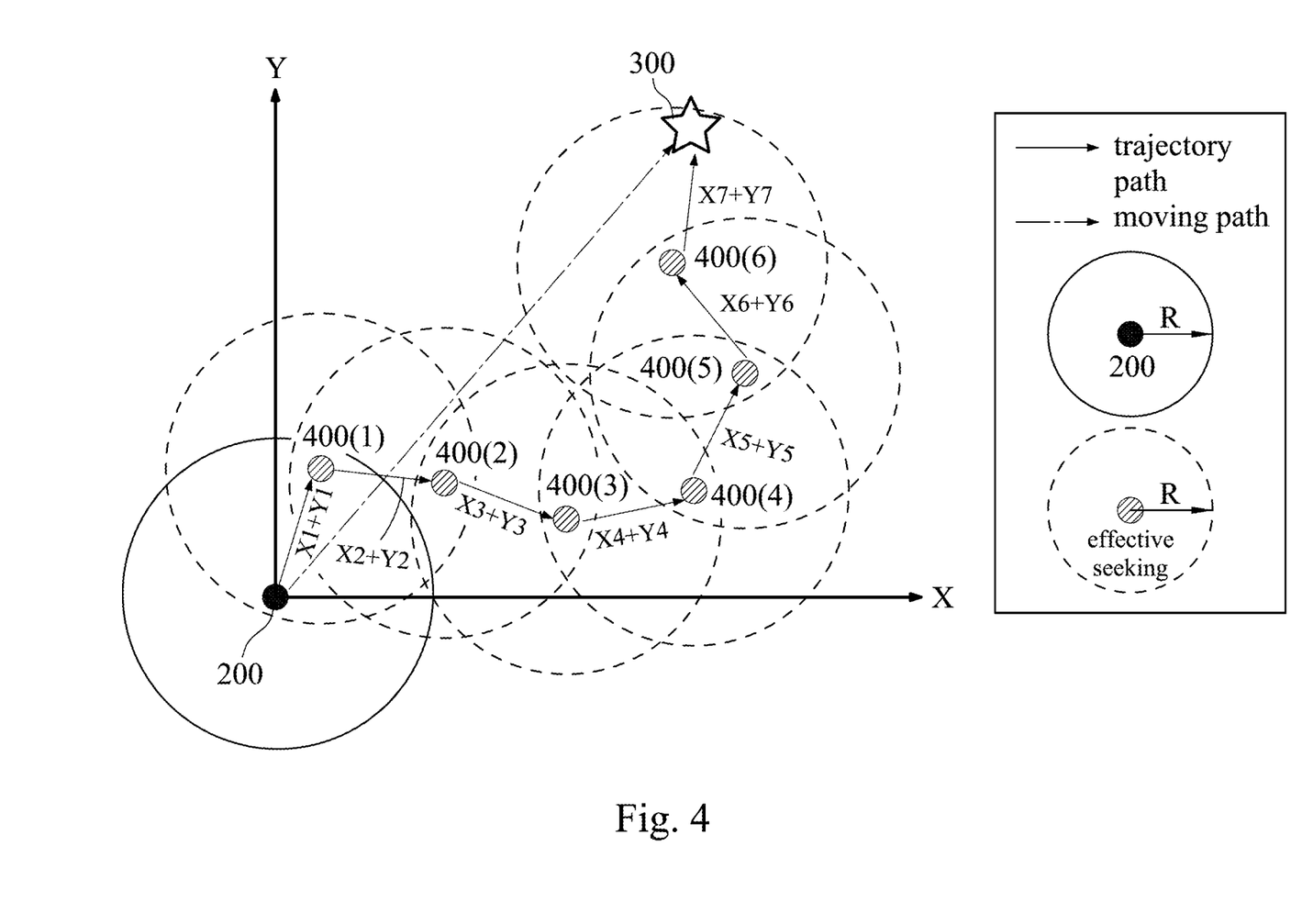
FIG. 4 is a schematic view when a host UWB device performs a two-dimensional seeking according to a 3rd embodiment of the present disclosure.

Please refer to FIG. 2 to FIG. 4. FIG. 3 is a flow chart of an ultra wideband (UWB) dynamic positioning method 100a according to a 2nd embodiment of the present disclosure, and FIG. 4 is a schematic view when a host UWB device 200 performs a two-dimensional seeking according to a 3rd embodiment of the present disclosure. As shown in figures, the host UWB device 200 could find the target UWB device 300 via six seeking UWB devices 400(i). The UWB dynamic positioning method 100a is the details performed in the UWB dynamic positioning method 100 of FIG. 1 for the host UWB device 200. The UWB dynamic positioning method 100a includes steps S102, S104, S106, S108, S110, S112, S114, S116, S118, S120, S122, S124, S126, S128, S130.

In the step S102, the host UWB device 200 is driven to switch on a sharing mode. In the step S104, the host UWB device 200 is driven to detect a mark of the UWB device around. In the step S106, the host UWB device 200 is driven to seek the mark of the target (i.e., the target UWB device 300). In the step S108, it confirms whether there is the target UWB device 300 within the seeking radius R of the host UWB device 200. If yes, the steps S110, S112, S114, S116 are performed; if no, the steps S118, S120 are performed. In the step S110, a relative position is feedbacked; that is, the relative position of the host UWB device 200 and the target UWB device 300 is feedbacked. In the step S112, a path is calculated according to the relative position. In the step S114, the host UWB device 200 moves toward the target according to the path obtained by the calculation. In the step S116, it confirms whether the host UWB device 200 reaches the target. If yes, the step S102 is performed again; if no, the step S108 is performed again. In the step S118, it utilizes a next order seeking UWB device 400(i) to perform a broadcasting seeking. In the step S120, it confirms whether the next order seeking UWB device 400(i) finds the target; that is, it confirms whether there is the target UWB device 300 around the next order seeking UWB device 400(i). If yes, the steps S122, S124, S126, S116 are performed; if no, the step S128 is performed. In the step S122, the relative positions of every order seeking UWB device 400(i) and the target UWB device 300 are sent back. In the step S124, the positions of each order seeking UWB device 400(i) and the target UWB device 300 are calculated to show an indicator or a trajectory path. In the step S126, the host UWB device 200 moves toward the target UWB device 300; that is, the host UWB device 200 moves toward the target UWB device 300 according to the indicator or the trajectory path. In the step S128, it confirms whether the seeking order i reaches the seeking limitation order n. If yes, the steps S130, S102 are performed; if no, the steps S118, S120 are performed. In the step S130, the seeking is stopped; that is, the host UWB device 200 and each order seeking UWB device 400(i) all stop seeking. i of the present embodiment is a positive integer, and i is larger than or equal to 1 and less than or equal to the seeking limitation order. The number of the seeking UWB devices 400(i) is less than the seeking limitation order n, the seeking limitation order n is the positive integer and larger than or equal to 2, and the seeking limitation order n of the present embodiment could be one of 5 to 10, but it is not limited herein.

In the embodiment of FIG. 4, the host UWB device 200 and six seeking UWB devices 400(1), 400(2), 400(3), 400(4), 400(5), 400(6) are used for detecting the target UWB device 300. The host UWB device 200 generates a first-order directional angle and a first-order plane distance according to the relative position of the host UWB device 200 and the first-order seeking UWB device 400(1). The X-axis parameter X1 and the Y-axis parameter Y1 of the seeking path are calculated via the first-order directional angle and the first-order plane distance. Furthermore, the first-order seeking UWB device 400(1) generates a second-order directional angle and a second-order plane distance according to the relative position of the first-order seeking UWB device 400(1) and the second-order seeking UWB device 400(2), and the second-order directional angle and the second-order plane distance are sent back to the host UWB device 200. The X-axis parameter X2 and the Y-axis parameter Y2 are calculated via the second-order directional angle and the second-order plane distance. Similarly, the second-order seeking UWB device 400(2) generates an X-axis parameter X3 and a Y-axis parameter Y3 of the seeking path; the third-order seeking UWB device 400(3) generates an X-axis parameter X4 and a Y-axis parameter Y4 of the seeking path; the fourth-order seeking UWB device 400(4) generates an X-axis parameter X5 and a Y-axis parameter Y5 of the seeking path; the fifth-order seeking UWB device 400(5) generates an X-axis parameter X6 and a Y-axis parameter Y6 of the seeking path; the sixth-order seeking UWB device 400(6) generates an X-axis parameter X7 and a Y-axis parameter Y7 of the seeking path. In other words, the host UWB device 200, the six seeking UWB devices 400(1), 400(2), 400(3), 400(4), 400(5), 400(6) and the target UWB device 300 form a trajectory path. The trajectory path includes seven seeking paths. The six seeking UWB devices 400(1), 400(2), 400(3), 400(4), 400(5), 400(6) all enter the seeking mode. The seeking mode includes detecting whether there is the target UWB device 300 or the i+1th-order seeking UWB device 400(i+1) around the ith-order seeking UWB device 400(i). In the present embodiment, there is the seeking UWB devices 400(2), 400(3), 400(4), 400(5), 400(6) respectively around the seeking UWB devices 400(1), 400(2), 400(3), 400(4), 400(5), and there is the target UWB device 300 around the seeking UWB device 400(6). A distance between two adjacent devices among the host UWB device 200, the six seeking UWB devices 400(1), 400(2), 400(3), 400(4), 400(5), 400(6) and the target UWB device 300 is less than or equal to the seeking radius R. A distance Dp of the trajectory path and a distance Dm of the moving path are respectively obtained by the following formula(1) and formula(2):

$$Dp=(X1+X2+X3+X4+X5+X6+X7)+(Y1+Y2+Y3+Y4+Y5+Y6+Y7) \qquad (1);$$

$$Dm=((X1+X2+X3+X4+X5+X6+X7)^2+(Y1+Y2+Y3+Y4+Y5+Y6+Y7)^2)^{1/2} \qquad (2).$$

Figure 5:
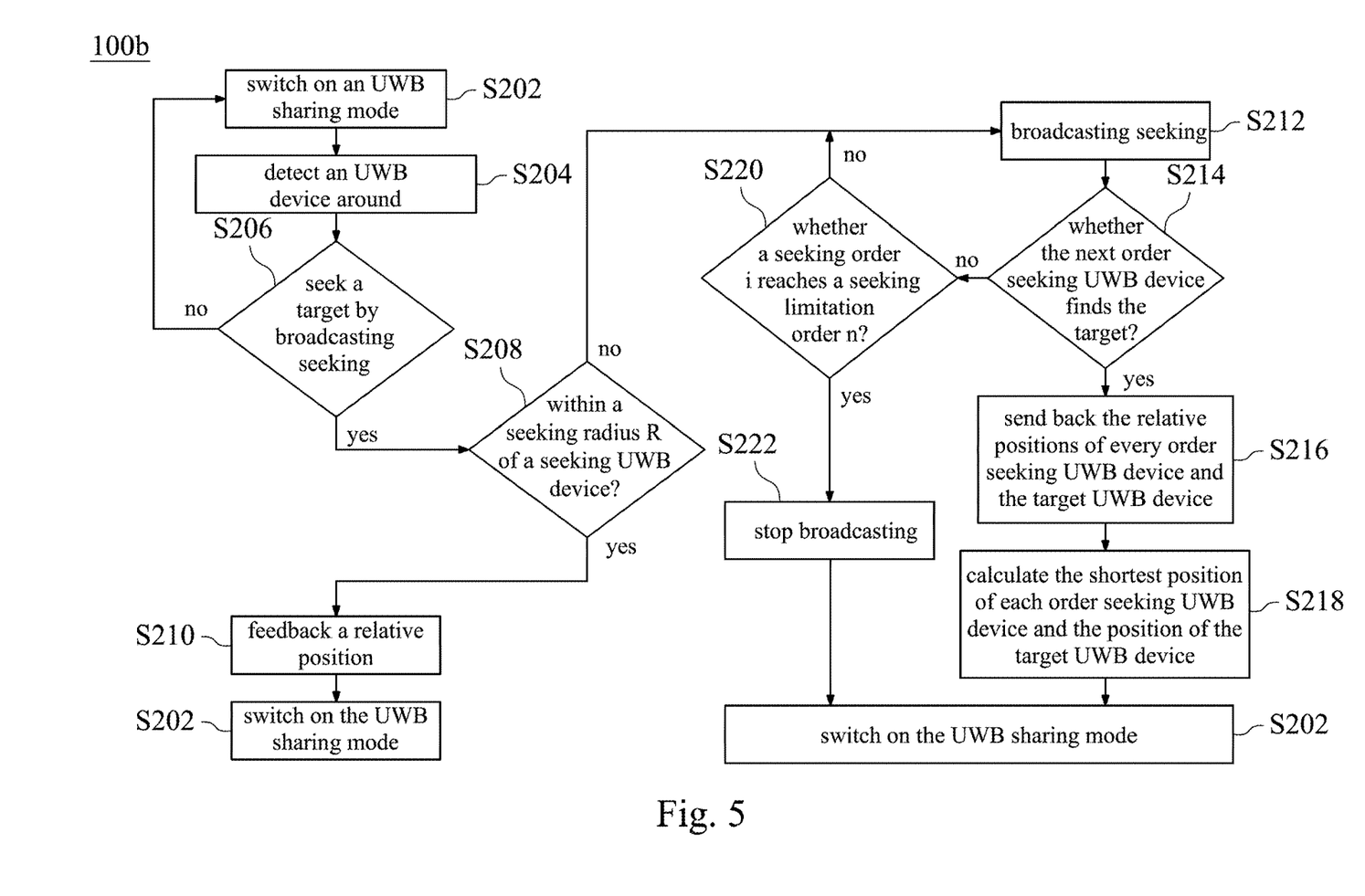
FIG. 5 is a flow chart of an ultra wideband (UWB) dynamic positioning method according to a 4th embodiment of the present disclosure.

Please refer to FIG. 4 and FIG. 5. FIG. 5 is a flow chart of an ultra wideband (UWB) dynamic positioning method 100b according to a 4th embodiment of the present disclosure. As shown in figures, the UWB dynamic positioning method 100b is the details performed in the UWB dynamic positioning method 100 of FIG. 1 for the ith-order seeking UWB device 400(i). The UWB dynamic positioning method 100b includes the steps S202, S204, S206, S208, S210, S212, S214, S216, S218, S220, S222.

In the step S202, the ith-order seeking UWB device 400(i) is driven to switch on a sharing mode. In the step S204, the ith-order seeking UWB device 400(i) is driven to detect the mark of the UWB device around. In the step S206, it confirms that whether the ith-order seeking UWB device 400(i) seeks the mark of the target UWB device 300 via the seeking broadcasting. If yes, it represents there in no target UWB device 300 within the seeking radius R of the host UWB device 200, and the step S208 is performed; if no, it represents that there is the target UWB device 300 within the seeking radius R of the host UWB device 200, and the step S202 is performed again. In the step S208, it confirms that whether there is the target UWB device 300 within the seeking radius R of the ith-order seeking UWB device 400(i). If yes, the steps S210, S202 are performed; if no, the steps S212, S214 are performed. In the step S210, the relative position is sent back, that is, the relative position of the ith-order seeking UWB device 400(i) and the target UWB device 300 is sent back to the host UWB device 200. In the step S212, the broadcasting seeking is performed by the i+1th-order seeking UWB device 400(i+1). In the step S214, it confirms that whether the i+1th-order seeking UWB device 400(i+1) finds the target, that is, it confirms that whether there is the target UWB device 300 around the i+1th-order seeking UWB device 400(i+1). If yes, the steps S216, S218, S202 are performed; if no, the step S220 is performed. In the step S216, the relative positions of each order seeking UWB devices 400(i), 400(i+1) and the target UWB device 300 are sent back. In the step S218, the positions of each order seeking UWB device 400(i), 400(i+1) and the target UWB device 300 are calculated so as to show the indicator or the trajectory path. If there is a plurality of trajectory paths, the shortest trajectory path would be chosen in the step S218. In the step S220, it confirms that whether the seeking order i reaches the seeking limitation order n. If yes, the steps S222, S202 are performed; if no, the steps S212, S214 are performed. In the step S222, the broadcasting is stopped, that is, each order seeking UWB devices 400(i), 400(i+1) all stop broadcasting. Accordingly, the UWB dynamic positioning method 100b of the present disclosure utilizes plural mobile UWB devices to mutually track with each other instead of setting a UWB base station so as to eliminate the cost of the UWB base station and perform dynamic positioning.

Figure 6:
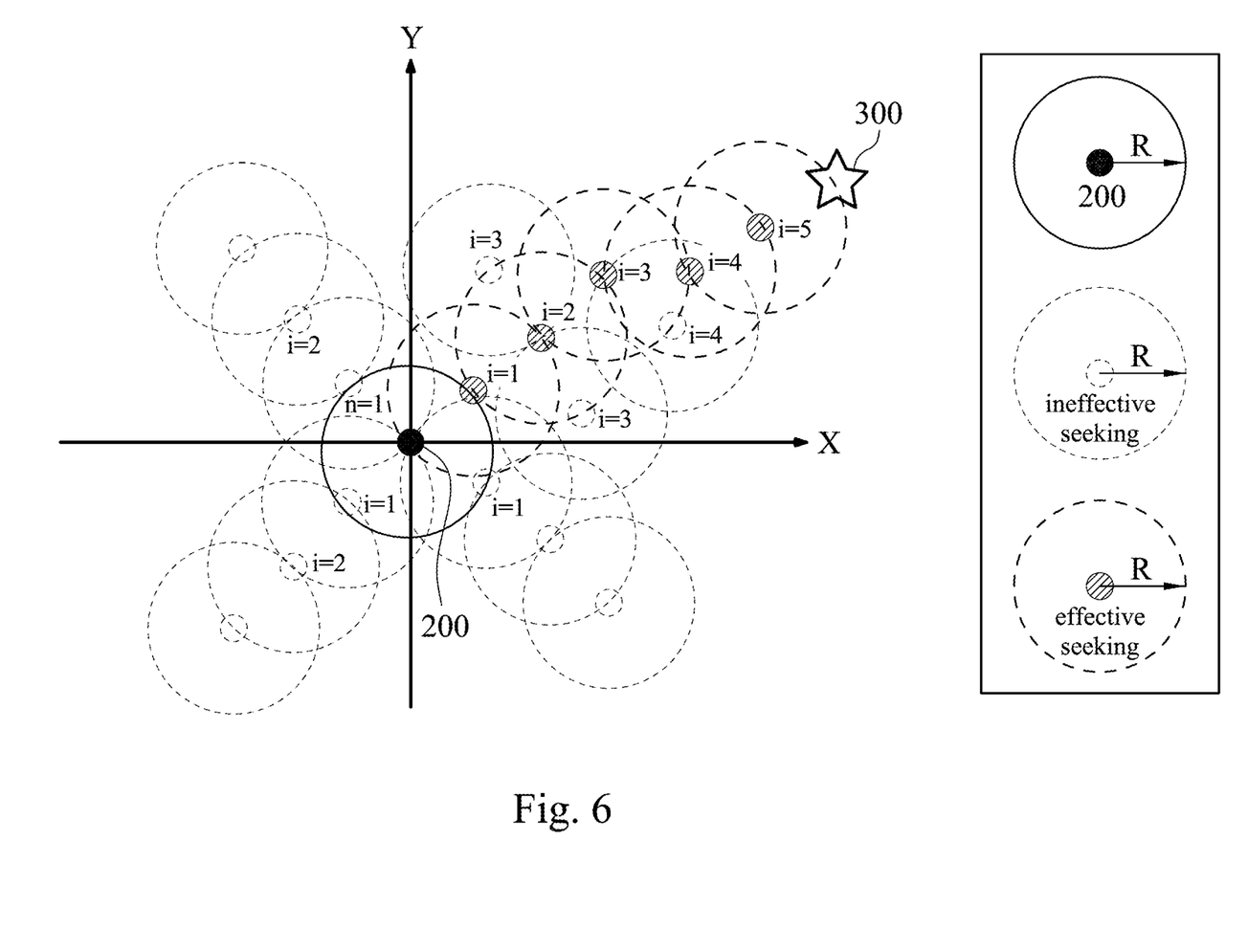
FIG. 6 is a schematic view when a host UWB device performs a diffusion seeking according to a 5th embodiment of the present disclosure.

Please refer to FIG. 6, which is a schematic view when a host UWB device 200 performs a diffusion seeking according to a 5th embodiment of the present disclosure. The host UWB device 200 performs a diffusion seeking in a mesh type, the seeking range is increased as the increasing order i, and the same point would not do two searches. During seeking, if the target UWB device 300 is found, at least one effective seeking is formed between the host UWB device 200 and the target UWB device 300, and the seeking UWB device 400(i) performing the effective seeking would send back all relative position information to the host UWB device 200 for calculating the seeking path. In the embodiment of FIG. 6, when i is 1, there are four seeking UWB devices 400(1) around the host UWB device 200, the target UWB device 300 is in the first quadrant, and there are five effective seeking formed between the host UWB device 200 and the target UWB device 300; however, the seeking in the second quadrant, in the third quadrant and in the fourth quadrant is ineffective, but the present disclosure is not limited herein.

Figure 7:
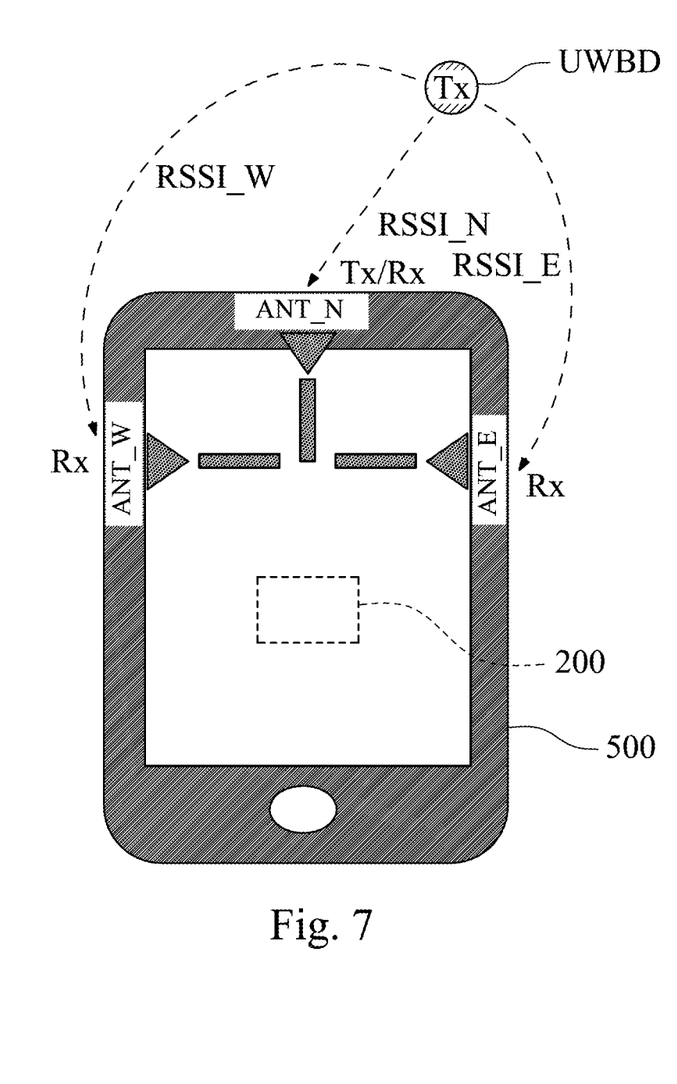
FIG. 7 is a schematic view of an ultra wideband (UWB) dynamic positioning system according to a 6th embodiment of the present disclosure.
Figure 8A:
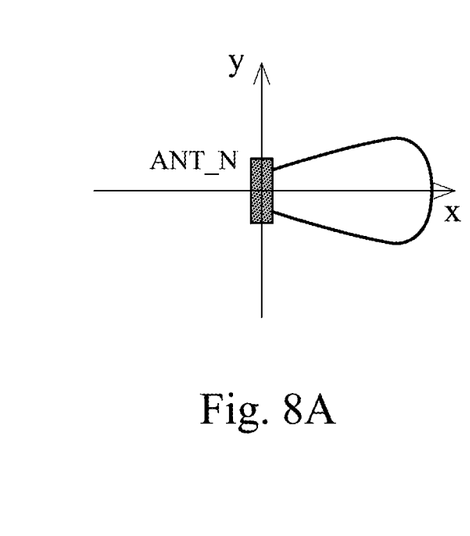
FIG. 8A is a schematic side view of the XY plane of the directional antenna in FIG. 7.
Figure 8B:
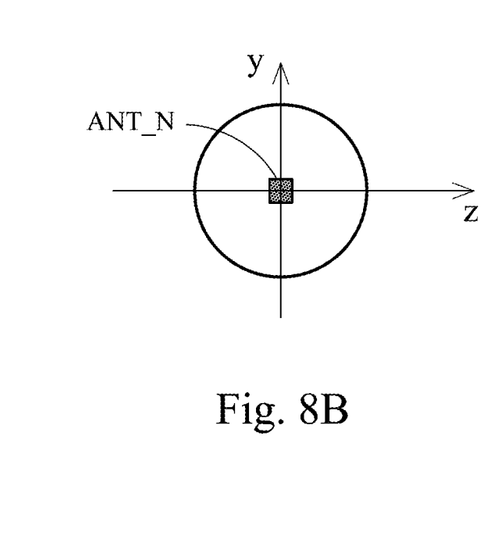
FIG. 8B is a schematic side view of the YZ plane of the directional antenna in FIG. 7.
Figure 8C:
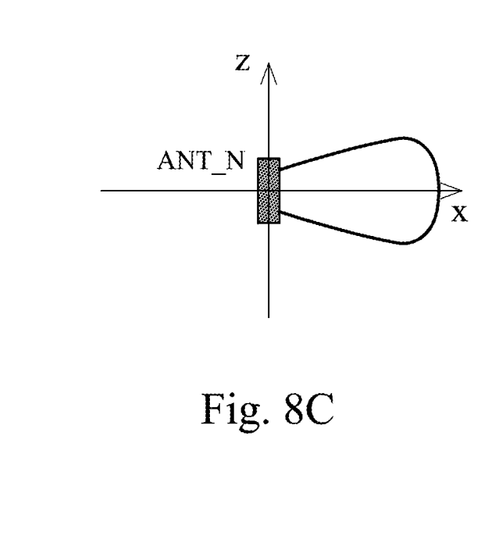
FIG. 8C is a schematic top view of the XZ plane of the directional antenna in FIG. 7.

Please refer to FIG. 7, FIG. 8A, FIG. 8B and FIG. 8C. FIG. 7 is a schematic view of an ultra wideband (UWB) dynamic positioning system according to a 6th embodiment of the present disclosure, FIG. 8A is a schematic side view of the XY plane of the directional antenna ANT_N in FIG. 7, FIG. 8B is a schematic side view of the YZ plane of the directional antenna ANT_N in FIG. 7, and FIG. 8C is a schematic top view of the XZ plane of the directional antenna ANT_N in FIG. 7. As shown in figures, the ultra wideband (UWB) dynamic positioning system includes a host UWB device 200, a target UWB device 300, at least one seeking UWB device 400(i), a housing 500, a transmitter Tx and a plurality of receivers Rx.

The host UWB device 200 is set inside the housing 500. The host UWB device 200 detects whether there is the target UWB device 300 or the seeking UWB device 400(i) around. The target UWB device 300 and the seeking UWB device 400(i) are in the sharing mode. The transmitter Tx and the receivers Rx are signally connected to the host UWB device 200 and set inside the housing 500. The host UWB device 200 detects whether there is the target UWB device 300 or the seeking UWB device 400(i) around via the transmitter Tx and the receivers Rx. Furthermore, the transmitter Tx is toward a first direction to set inside the housing 500. The number of the receivers Rx is three and is toward plural second directions respectively to set inside the housing 500. One of the second directions is the same as the first direction; in other words, one of the three receivers Rx is toward the same direction as the transmitter Tx, and the other two receivers Rx are toward other directions. The transmitter Tx and one of the receivers Rx of the present embodiment are forward (the first direction), and the other two receivers Rx are respectively toward left and right, thereby increasing the cover range of the receiving. Additionally, at least one of the target UWB device 300, the seeking UWB device 400(i) and the host UWB device 200 is connected to a Subscriber Identity Module (SIM) or an Electronic Subscriber Identity Module (eSIM). Moreover, the transmitter Tx and three receivers Rx are configured three directional antennas ANT_W, ANT_N, ANT_E, these three directional antennas ANT_W, ANT_N, ANT_E are the same as one another. The cover range of the XY plane, the YZ plane and the XZ plane of the directional antenna ANT_N are shown as FIG. 8A, FIG. 8B and FIG. 8C, respectively. A received signal strength indicator (RSSI) between an ultra wideband device (UWBD) and the host UWB device 200 is used to identify the direction and the distance of the UWBD relative to the host UWB device 200, and different directional antenna ANT_W, ANT_N, ANT_E respectively receives different received signal strength indicator RSSI_W, RSSI_N, RSSI_E, thereby identifying the direction and the distance precisely. The ultra wideband device UWBD could be the target UWB device 300, the seeking UWB device 400(i) or other ultra wideband device near to the host UWB device 200.

Figure 9:
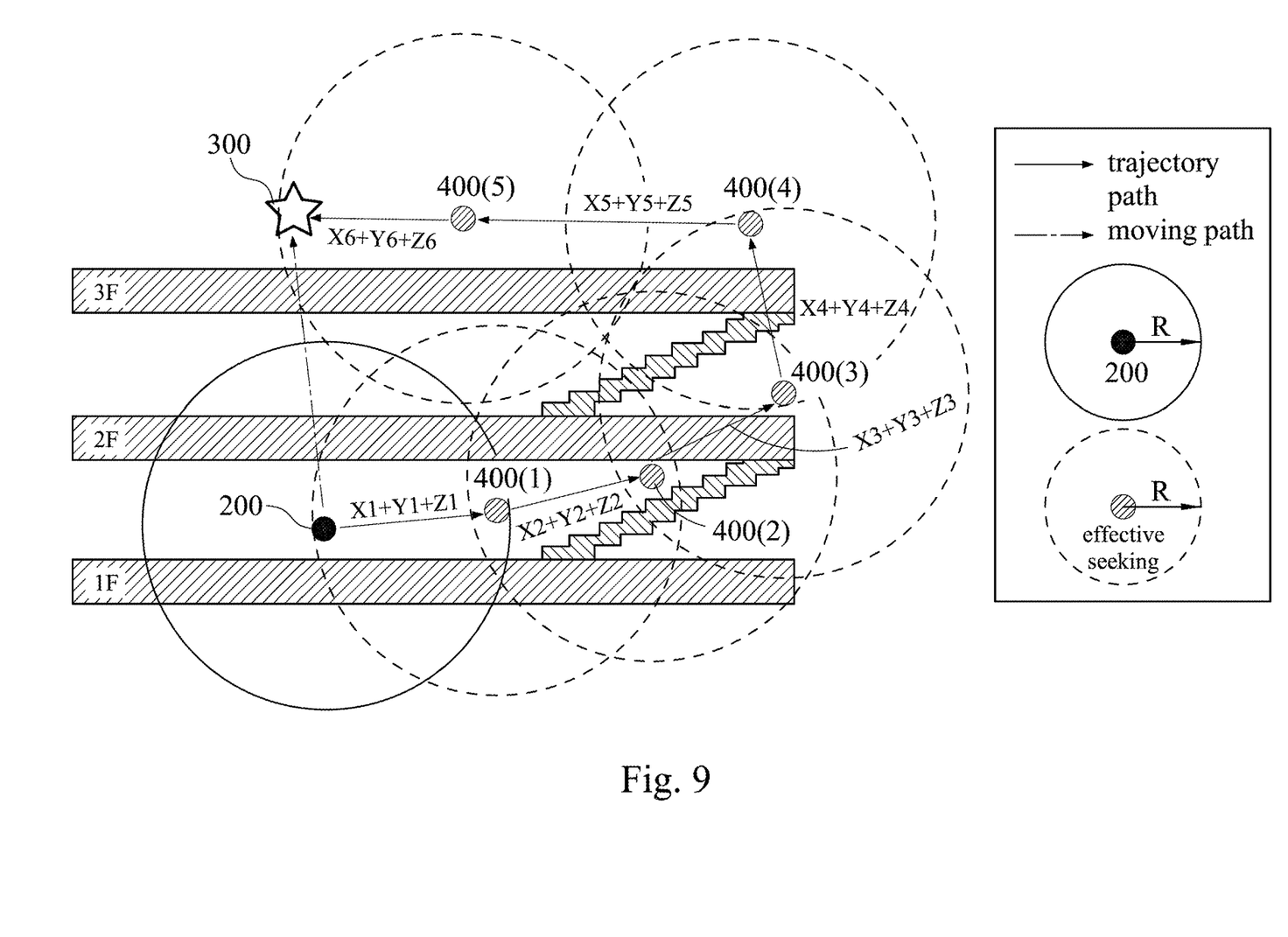
FIG. 9 is a schematic view when a host UWB device performs a three-dimensional seeking according to a 7th embodiment of the present disclosure.

Please refer to FIG. 4 and FIG. 9. FIG. 9 is a schematic view when a host UWB device 200 performs a three-dimensional seeking according to a 7th embodiment of the present disclosure. The difference between FIG. 4 and FIG. 9 is that the host UWB device 200 and the target UWB device 300 at the same plane to perform the two-dimensional seeking in FIG. 4, however, the host UWB device 200 and the target UWB device 300 at different plane to perform the three-dimensional seeking in FIG. 9, that is, there is a height difference between the host UWB device 200 and the target UWB device 300. In detail, the host UWB device 200 generates six directional angles (from the first-order directional angle to the sixth-order directional angle), six plane distances (from the first-order plane distance to the sixth-order plane distance) and six height distances (from the first-order height distance to the sixth-order height distance) according to the relative position of the host UWB device 200, five seeking UWB devices 400(1), 400(2), 400(3), 400(4), 400(5) and the target UWB device 300, and the X-axis parameters (X1-X6), the Y-axis parameters (Y1-Y6) and the Z-axis parameters (Z1-Z6) of the trajectory path are calculated by the six directional angles, the six plane distances and the six height distances. The host UWB device 200 calculates and obtains the moving path between the host UWB device 200 and the target UWB device 300 according to the six directional angles, the six plane distances and the six height distances. The distance Dp of the trajectory path and the distance Dm of the moving path are respectively obtained by the following formula (3) and formula (4):

$$Dp=(X1+X2+X3+X4+X5+X6)+(Y1+Y2+Y3+Y4+Y5+Y6)+(Z1+Z2+Z3+Z4+Z5+Z6) \quad (3);$$

$$Dm=((X1+X2+X3+X4+X5+X6)^3+(Y1+Y2+Y3+Y4+Y5+Y6)^3+(Z1+Z2+Z3+Z4+Z5+Z6)^3)^{1/3} \quad (4).$$

Furthermore, it is worth mentioned that if the height difference between the host UWB device 200 and the target UWB device 300 is more than 4 m (Z(SUM)>+/−4 m), it represents that the host UWB device 200 and the target UWB device 300 are on the different floors. In the present embodiment, Z(SUM)=Z1+Z2+Z3+Z4+Z5+Z6>8 m, so the height difference between the host UWB device 200 and the target UWB device 300 is two floors (the host UWB device 200 is on the first floor, and the target UWB device 300 is on the third floor). Of course, the floors height of the various buildings is different, so the setting and the determination of the height difference is based on the real height of the building, and the present disclosure is not limited herein. Accordingly, the UWB dynamic positioning system of the present disclosure utilize plural mobile UWB devices to mutually track with each other instead of setting a UWB base station, eliminating the cost of the UWB base station and performing dynamic positioning and height positioning, so as to resolve the problem of the positioning technique in prior art which needs to set a UWB base station and the height information could not be known.

Figure 10:
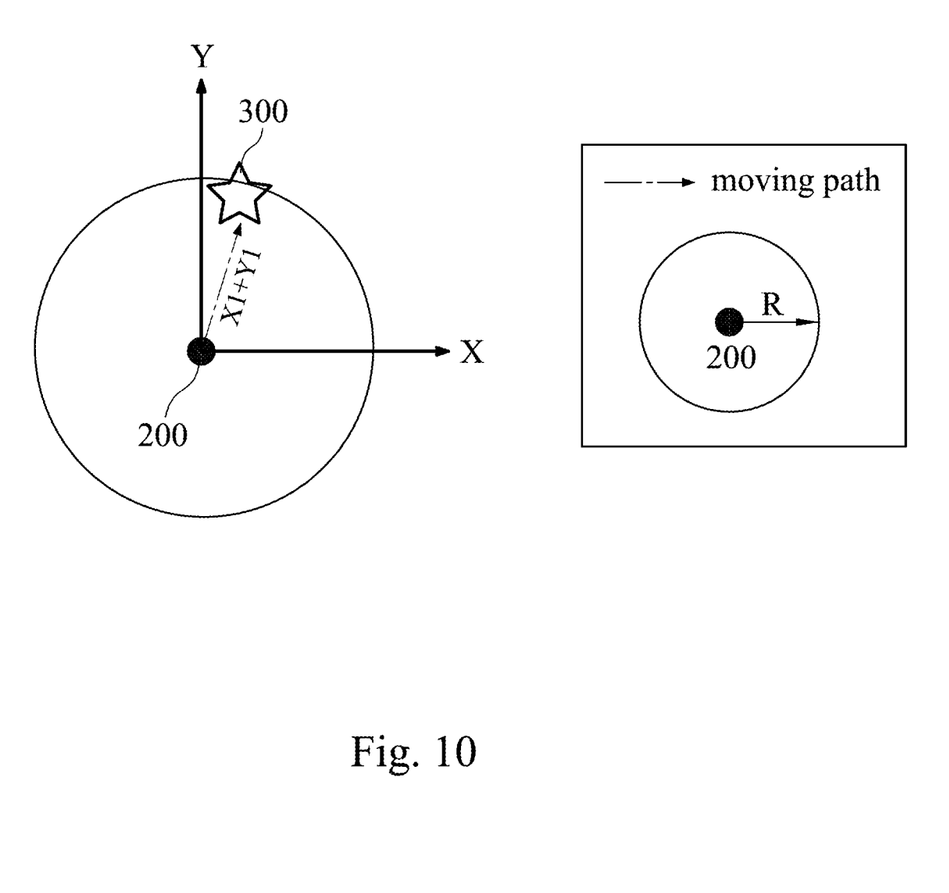
FIG. 10 is a schematic view when a host UWB device performs a two-dimensional seeking according to an 8th embodiment of the present disclosure.

FIG. 10 is a schematic view when a host UWB device 200 performs a two-dimensional seeking according to an 8th embodiment of the present disclosure. The host UWB device 200 detects the target UWB device 300 directly. The host UWB device 200 generates a first-order directional angle and a first-order plane distance according to the relative position of the host UWB device 200 and the target UWB device 300. The X-axis parameter X1 and the Y-axis parameter Y1 of the moving path are calculated by the first-order directional angle and the first-order plane distance. The distance between the host UWB device 200 and the target UWB device 300 is less than or equal to a seeking radius R. The distance Dm of the moving path is obtained by the following formula (5):

$$Dm=((X1)^2+(Y1)^2)^{1/2} \quad (5).$$

Figure 11:
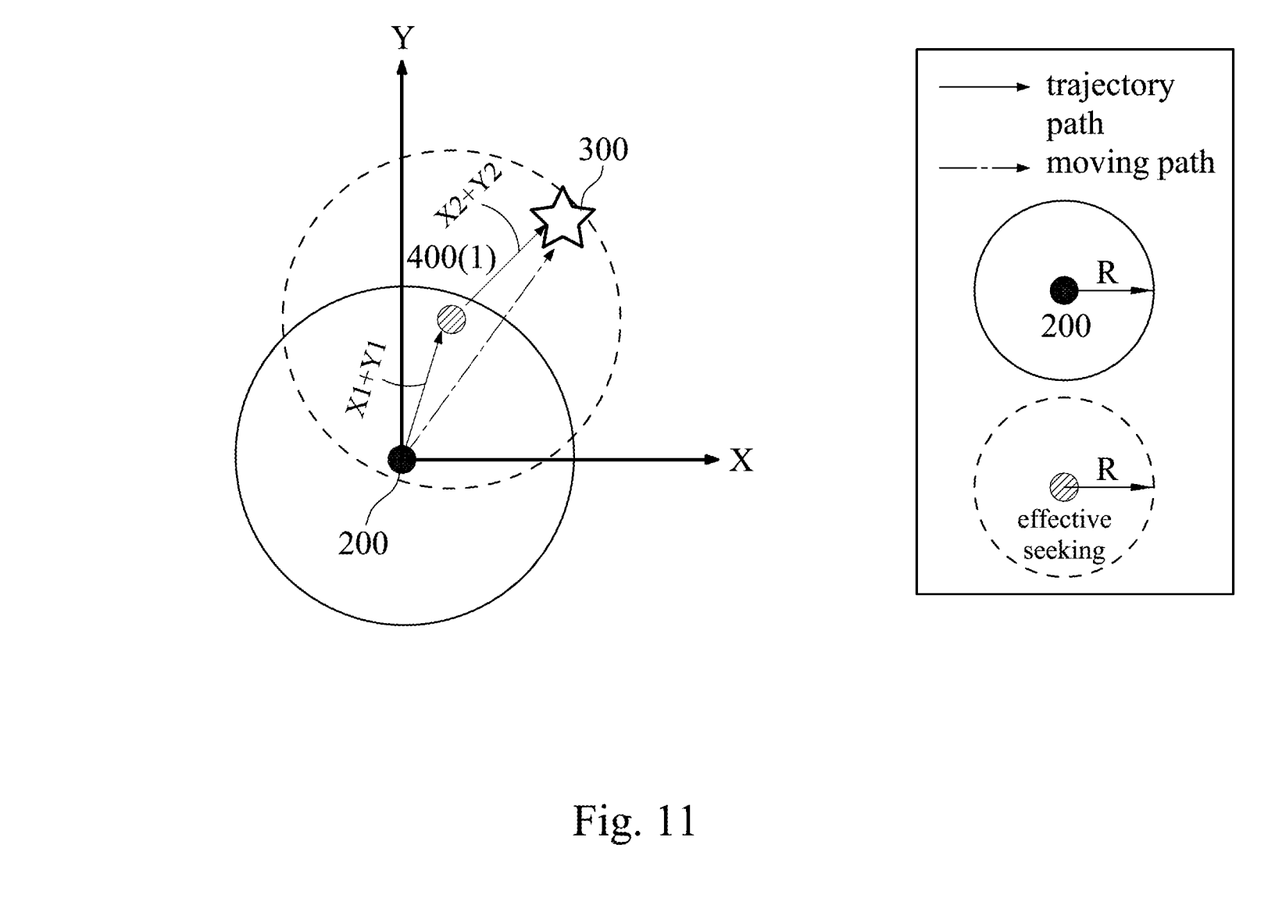
FIG. 11 is a schematic view when a host UWB device performs a two-dimensional seeking according to a 9th embodiment of the present disclosure.

FIG. 11 is a schematic view when a host UWB device 200 performs a two-dimensional seeking according to a 9th embodiment of the present disclosure. The target UWB device 300 is detected by the host UWB device 200 and the first-order seeking UWB device 400(1). The host UWB device 200 generates a first-order directional angle and a first-order plane distance according to the relative position of the host UWB device 200 and the first-order seeking UWB device 400(1). The X-axis parameter X1 and the Y-axis parameter Y1 of the seeking path are calculated by the first-order directional angle and the first-order plane distance. Furthermore, the first-order seeking UWB device 400(1) generates a second-order directional angle and a second-order plane distance according to the relative position of the first-order seeking UWB device 400(1) and the target UWB device 300, and the second-order directional angle and the second-order plane distance are sent back to the host UWB device 200. The X-axis parameter X2 and the Y-axis parameter Y2 of the seeking path are calculated by the second-order directional angle and the second-order plane distance. In other words, the host UWB device 200, the first-order seeking UWB device 400(1) and the target UWB device 300 form a trajectory path, and the trajectory path includes two seeking paths. The first-order seeking UWB device 400(1) enters the seeking mode. A distance between the two adjacent devices among the host UWB device 200, the first-order seeking UWB device 400(1) and the target UWB device 300 is less than or equal to a seeking radius R. The distance Dp of the trajectory path and the distance Dm of the moving path are respectively obtained by the following formula (6) and formula (7):

$$Dp=(X1+X2)+(Y1+Y2) \quad (6);$$

$$Dm=((X1+X2)^2+(Y1+Y2)^2)^{1/2} \quad (7).$$

Accordingly, the moving direction and the moving distance could be calculated precisely by the several directional angles and the several plane distances.

According to the foregoing embodiments, the present disclosure has the following advantages. First, as the power of the ultra wideband is very low power and the ultra wideband has the characteristic of strong penetrating power, high safety, high transmission volume and positioning with high precisely, the UWB dynamic positioning method and system thereof in the present disclosure utilize plural mobile UWB devices to mutually track with each other instead of setting a UWB base station, eliminating the cost of the UWB base station and performing dynamic positioning and height positioning so as to resolve the problem of the positioning technique in prior art which needs to set a UWB base station and needs larger power consumption, and the signal could not penetrate the wall, the precision of positioning is not good enough and the height information could not be known. Second, the UWB dynamic positioning method and system thereof in the present disclosure could perform a seeking by a reciprocity method without disclosing personal information, a seeking of an authorized target and a real-time people control. Third, the UWB dynamic positioning system of the present disclosure could be combined with a Subscriber Identity Module (SIM) or an Electronic Subscriber Identity Module (eSIM), expanding the application of the UWB to any connection device and could be combined with a wireless wide area network (WWAN), a global positioning system (GPS) or a Wi-Fi positioning to perform a combined road guiding.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An ultra wideband (UWB) dynamic positioning method, comprising:
    performing a target UWB device detecting step, wherein the target UWB device detecting step comprises driving a host UWB device to detect whether there is a target UWB device or at least one first-order seeking UWB device around the host UWB device, and then generating a detecting result; and
    performing a host UWB device operation deciding step, wherein the host UWB device operation deciding step comprises deciding an operating mode of the host UWB device according to the detecting result;
    wherein there is the at least one first-order seeking UWB device around the host UWB device without the target UWB device, and the operating mode comprises switching on the at least one first-order seeking UWB device to enter a seeking mode.

2. The ultra wideband (UWB) dynamic positioning method of claim 1, wherein
    a distance between the host UWB device and the at least one first-order seeking UWB device is less than or equal to a seeking radius;
    wherein within the seeking radius, at least one UWB device farthest to the host UWB device is chosen to be the at least one first-order seeking UWB device.

3. The ultra wideband (UWB) dynamic positioning method of claim 2, wherein the seeking mode comprises:
    performing an ith-order seeking step, wherein the ith-order seeking step comprises detecting whether there is the target UWB device or at least one i+1th-order seeking UWB device around at least one ith-order seeking UWB device;
    wherein i is a positive integer, and i is larger than or equal to 1 and less than or equal to a seeking limitation order.

4. The ultra wideband (UWB) dynamic positioning method of claim 3, wherein the ith-order seeking step comprises:
    performing a first seeking sub-step, wherein the first seeking sub-step comprises when there is the target UWB device around the at least one ith-order seeking UWB device, calculating a first-order seeking path to an ith-order seeking path between the host UWB device and the at least one ith-order seeking UWB device and an i+1th-order seeking path from the at least one ith-order seeking UWB device to the target UWB device, and then calculating the moving direction from the host UWB device to the target UWB device according to the first-order seeking path to the i+1th-order seeking path, and then stopping detection;
    wherein a distance between the at least one ith-order seeking UWB device and the target UWB device is less than or equal to the seeking radius.

5. The ultra wideband (UWB) dynamic positioning method of claim 4, wherein the ith-order seeking step comprises:
    performing a second seeking sub-step, wherein the second seeking sub-step comprises when there is the at least one i+1 th-order seeking UWB device around the ith-order seeking UWB device without the target UWB device, switching on the at least one i+1 th-order seeking UWB device to perform an i+1th-order seeking step;
    wherein a distance between the at least one ith-order seeking UWB device and the at least one i+1 th-order UWB device is less than or equal to the seeking radius.

6. The ultra wideband (UWB) dynamic positioning method of claim 5, wherein the ith-order seeking step comprises:
    performing a third seeking sub-step, wherein the third seeking sub-step comprises when there is not any UWB device around the at least one ith-order seeking UWB device, stopping detection.

7. The ultra wideband (UWB) dynamic positioning method of claim 6, wherein in the ith-order seeking step,
    when i is less than or equal to the seeking limitation order, performing the first seeking sub-step, the second seeking sub-step and the third seeking sub-step of the ith-order seeking step via the at least one ith-order seeking UWB device, and then i is increased by adding 1 to repeat the first seeking sub-step, the second seeking sub-step and the third seeking sub-step of the ith-order seeking step, until the target UWB device is found or there is not any UWB device around; and
    when i is larger than the seeking limitation order, stopping detection.

8. The ultra wideband (UWB) dynamic positioning method of claim 4, wherein the host UWB device operation deciding step further comprises:
    driving the host UWB device to generate angles from a first-order directional angle to an ith-order directional angle and generate distances from a first-order plane distance to an ith-order plane distance according to a relative position in sequence from the host UWB device to the at least one ith-order seeking UWB device, and calculating from the first-order seeking path to the ith-order seeking path according to the angles from the first-order directional angle to the ith-order direction angel and the distances from the first-order plane distance to the ith-order plane distance;

driving the at least one ith-order seeking UWB device to generate an i+1th-order directional angle and an i+1th-order plane distance according to the relative position of the at least one ith-order seeking UWB device and the target UWB device, and sending the i+1th-order directional angle and the i+1th plane distance back to the host UWB device, and then calculating the i+1 th-order seeking path by the host UWB device according to the i+1 th-order directional angle and the i+1 th plane distance; and driving the host UWB device to calculate the moving direction between the host UWB device and the target UWB device according to paths from the first-order seeking path to the i+1 th-order seeking path.

9. The ultra wideband (UWB) dynamic positioning method of claim 8, wherein the host UWB device operation deciding step further comprises:

driving the host UWB device to generate distances from a first-order height distance to an ith-order height distance according to the relative position in sequence from the host UWB device to the ith-order seeking UWB device;

driving the at least one ith-order seeking UWB device to generate an i+1 th-order height distance according to the relative position of the at least one ith-order seeking UWB device and the target UWB device, and sending the i+1 th-order height distance back to the host UWB device; and driving the host UWB device to calculate and obtain the moving direction between the host UWB device and the target UWB device according to angles from the first-order directional angle to the i+1 th-order directional angle, distances from the first-order plane distance to the i+1 th-order plane distance, and distances from the first-order height distance to the i+1 th-order height distance.

10. An ultra wideband (UWB) dynamic positioning system for using an UWB dynamic positioning method, comprising:

a target UWB device;
a at least one first-order seeking UWB device; and
a host UWB device, configured to detect whether there is the target UWB device or the at least one first-order seeking UWB device around;
wherein the UWB dynamic positioning method comprises:
performing a target UWB device detecting step, wherein the target UWB device detecting step comprises driving the host UWB device to detect whether there is the target UWB device or the at least one first-order seeking UWB device around the host UWB device, and then generating a detecting result; and
performing a host UWB device operation deciding step, wherein the host UWB device operation deciding step comprises deciding an operating mode of the host UWB device according to the detecting result;
wherein when there is the target UWB device around the host UWB device, the host UWB device generates a moving direction, and the operating mode comprises calculating the moving direction from the host UWB device to the target UWB device;
wherein when there is the at least one first-order seeking UWB device around the host UWB device without the target UWB device, the at least one first-order seeking UWB device enters a seeking mode, and the operating mode comprises switching on the at least one first-order seeking UWB device to enter the seeking mode.

11. The ultra wideband (UWB) dynamic positioning system of claim 10, wherein when there is the target UWB device around the host UWB device, a distance between the host UWB device and the target UWB device is less than or equal to a seeking radius; and when there is the at least one first-order seeking UWB device around the host UWB device, a distance between the host UWB device and the at least one first-order seeking UWB device is less than or equal to the seeking radius;

wherein within the seeking radius, at least one UWB device farthest to the host UWB device is chosen to be the at least one first-order seeking UWB device.

12. The ultra wideband (UWB) dynamic positioning system of claim 10, further comprising:

a housing, wherein the host UWB device is set inside the housing;
a transmitter, signally connected to the host UWB device and set inside the housing; and
a plurality of receivers, signally connected to the host UWB device and set inside the housing;
wherein the host UWB device detects whether there is the target UWB device or the at least one first-order seeking UWB device around via the transmitter and the receivers.

13. The ultra wideband (UWB) dynamic positioning system of claim 12, wherein when the host UWB device detects that there is at least one first-order seeking UWB device around via the transmitter and the receivers, and there is the target UWB device around the at least one first-order seeking UWB device, the host UWB device generates a first-order directional angle and a first-order plane distance according to a relative position of the host UWB device and the at least one first-order seeking UWB device, and the at least one first-order seeking UWB device generates a second-order directional angle and a second-order plane distance according to the relative position of the at least one first-order seeking UWB device and the target UWB device, and the second-order directional angle and the second-order plane distance is sent back to the host UWB device, the host UWB device calculates the moving direction between the host UWB device and the target UWB device according to the first-order directional angle, the first-order plane distance, the second-order directional angle and the second-order plane distance.

14. The ultra wideband (UWB) dynamic positioning system of claim 13, wherein, the host UWB device generates a first-order height distance according to the relative position of the host UWB device and the at least one first-order seeking UWB device; and
the at least one first-order seeking UWB device generates a second-order height distance according to the relative position of the first-order seeking UWB device and the target UWB device, and the second-order height distance is sent back to the host UWB device;
wherein the host UWB device calculates and obtains the moving direction between the host UWB device and the target UWB device according to the first-order directional angle, the first-order plane distance, the first-order height distance, the second-order directional angle, the second-order plane distance and the second-order height distance.

15. The ultra wideband (UWB) dynamic positioning system of claim 12, wherein,
the transmitter is toward a first direction to set inside the housing; and
a number of the receivers is three, and the receivers are toward a plurality of second directions, respectively, to set inside the housing, and one of the second directions is the same as the first direction.

16. The ultra wideband (UWB) dynamic positioning system of claim 10, wherein at least one of the target UWB device, the at least one first-order seeking UWB device and the host UWB device is connected to a subscriber identity module (SIM) or an electronic subscriber identity module (eSIM).

* * * * *